3 Sheets—Sheet 1.
L. STIERINGER.
ELECTRICAL FIXTURE.
No. 11,478. Reissued Mar. 12, 1895.
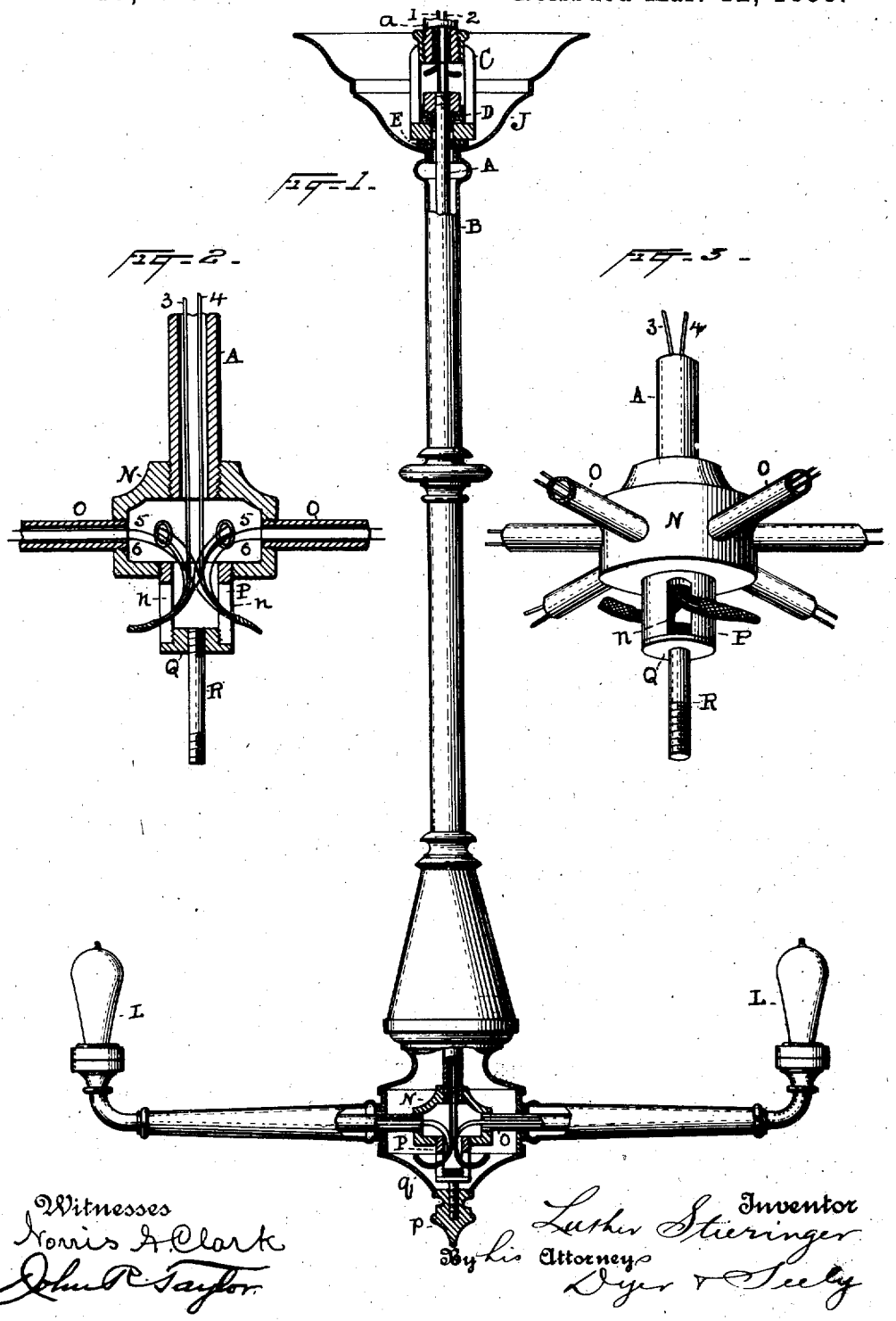
Witnesses
Norris A. Clark
John R. Taylor
Inventor
Luther Stieringer
By his Attorneys
Dyer & Seely

L. STIERINGER.

ELECTRICAL FIXTURE.

No. 11,478. Reissued Mar. 12, 1895.

Witnesses
Morris A. Clark.
John R. Taylor.

Inventor
Luther Stieringer.
By his Attorneys
Dyer & Seely.

3 Sheets—Sheet 3.
L. STIERINGER.
ELECTRICAL FIXTURE.
No. 11,478. Reissued Mar. 12, 1895.
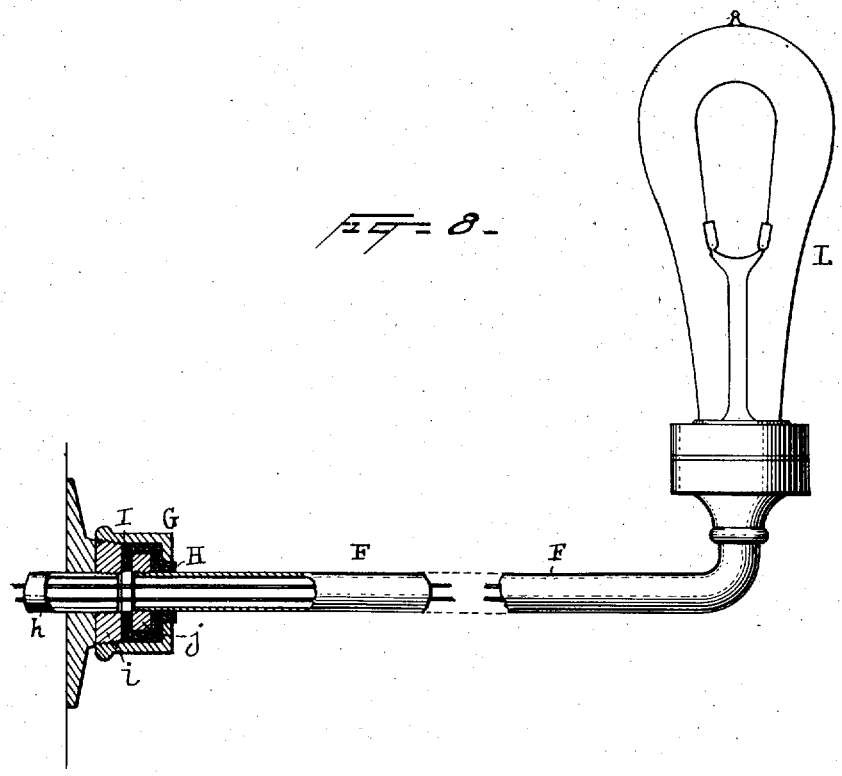
Witnesses
Morris A. Clark
John R. Taylor
Luther Stieringer Inventor
By his Attorneys
Dyer & Seely

UNITED STATES PATENT OFFICE.

LUTHER STIERINGER, OF NEW YORK, N. Y., ASSIGNOR, BY DIRECT AND MESNE ASSIGNMENTS, TO GEORGE MAITLAND, OF DETROIT, MICHIGAN.

ELECTRICAL FIXTURE.

SPECIFICATION forming part of Reissued Letters Patent No. 11,478, dated March 12, 1895.

Original No. 259,235, dated June 6, 1882. Application for reissue filed December 21, 1894. Serial No. 532,578.

*To all whom it may concern:*

Be it known that I, LUTHER STIERINGER, of New York city, in the county and State of New York, have invented a certain new and useful Improvement in Electrical Fixtures, of which the following is a specification.

The object I have in view is, first, to utilize the convenient and efficient support afforded by the gas-pipe of a house for sustaining fixtures for electric lights, constructed wholly or largely of metal and provided with insulated electric conducting wires for conveying the electric current to and from the lamp or lamps supported thereby, and to provide means for preventing the formation of a ground-connection when one conductor accidentally becomes electrically connected with some metallic part of the fixture; and, further, to use in electric light fixtures the forms of construction heretofore employed for gas-fixtures, and to devise means whereby fixtures of that description can be readily provided with suitable conducting-wires running through the interior of the same and hidden entirely from sight, and so that the proper connections of the wires can be conveniently and cheaply made, and will also be removed from view. This part of the object of my invention extends as well to the internal wiring for electric-light purposes of the gas-fixtures at present in use, which may be done by the means devised by me at small expense and without affecting or changing in the least the appearance or ornamentation of the fixture.

The invention consists in the novel means employed by me to accomplish the requirements of the foregoing object, as hereinafter pointed out by the claims.

The preferred constructions for carrying out my invention are shown in the accompanying drawings, in which—

Figure 4:
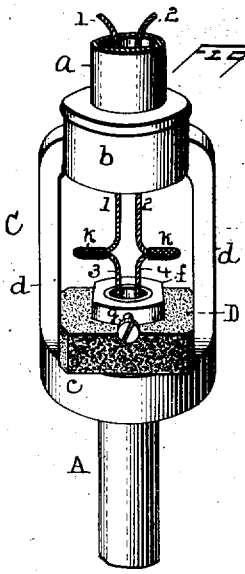
Figure 5:
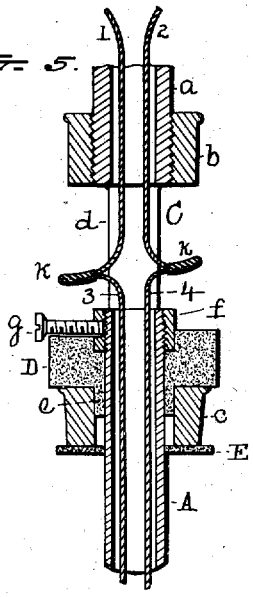
Figure 6:
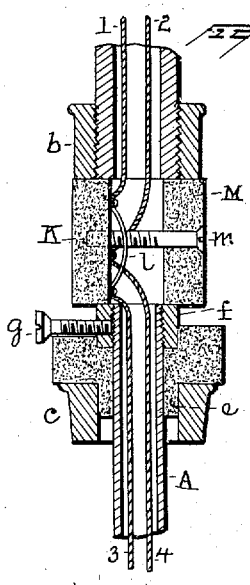

Figure 1 is an elevation and partial vertical section of a chandelier embodying the invention; Fig. 2, a vertical section, on a larger scale, of the distributing and supporting body of the chandelier and the parts connected directly therewith; Fig. 3, a perspective view from beneath of the same; Fig. 4, a perspective view of the upper or ceiling joint of the chandelier; Fig. 5, a vertical section of the same; Fig. 6, a vertical section of the upper or ceiling joint, showing a modified form of the connections, Fig. 7, a vertical section of the body of a chandelier, showing a modified form of construction; and Fig. 8, an elevation and partial section of a wall-bracket embodying the first feature of my invention.

Like letters denote corresponding parts in all the figures.

A is a chandelier-stem, which is a simple pipe surrounded by a suitable ornamental covering, B, and *a* is the gas or other pipe projecting from the ceiling.

C is an open section or joint connecting the stem A and pipe *a*. This joint is composed of upper and lower rings, *b c*, which are connected by opposite arms or links, *d d*, the rings and arms being cast in one piece and preferably made malleable. The upper ring *b* is provided with a female screw-thread engaging with the screw-threaded end of pipe *a*. The lower ring, *c*, through which the stem A passes, has an opening larger than such stem to prevent contact between the ring and stem.

D is a block of insulating material—such as vulcanized fiber—which rests upon the ring *c* between the arms *d d*, and has a circular flange, *e*, projecting down into the opening through such ring. The stem A passes through this block, and a nut, *f*, engages its upper end, which nut rests in a depression formed in the block. A set-screw, *g*, is employed, which prevents the stem from turning in the nut *f*, while the engagement of such nut with the insulating-block and of such insulating-block with the arms *d d* locks the parts at this point, so as to prevent the turning of the chandelier.

E is a washer, of insulating material, which is placed over the stem A between the ring *c* of the open joint and the ornamental covering B to complete the insulation of the chandelier from the pipe *a*. It will be seen that the chandelier can assume a true vertical position, even if the pipe *a* is not true, without injury to any parts and without affecting the electrical separation, since the nut *f* will rock sufficiently for this purpose in its seat in the block D.

The electric insulation of the fixture from the supporting gas pipe can be applied to wall-brackets as well as to chandeliers. A way of doing this is shown in Fig. 8.

F is the bracket-arm carrying the incandescing electric lamp L, and having the insulated conducting-wires passing therethrough, and *h* is the gas or other pipe projecting from the wall. The pipe *h* engages a collar, *i*, screwed thereon, while a smaller collar, *j*, is screwed upon the inner end of F. A screw-cap, G, is employed to connect the parts, which screw-cap is insulated from the arm F and collar *j* by a cap, H, of insulating material. An insulating-washer, I, is placed between the collars *i* and *j*, to complete the insulation of the parts.

Referring again to the chandelier, 1 2 represent the conducting-wires in the ceiling, and 3 4 the main conducting-wires of the chandelier, passing through the stem A and projecting out between the arms of the open joint C. All the wires, it will be understood, are insulated. The ceiling-wires 1 2 pass down through the pipe *a* when such pipe is utilized for that purpose; but if the gas is still used at some points in the house the wires 1 2 will be brought down on the outside of the pipe *a* and the ring *b* will be made solid on its lower side, so as to close such pipe *a* and prevent the escape of gas. The wires 1 2 and 3 4 have the insulation scraped from their ends, and they are then secured together electrically by twisting them together or wrapping them with fine wire, after which the connections *k k* are preferably soldered. These connections are then wrapped or covered with suitable insulating material. Preferably only one of such connections is made, while the other two wires are connected through a "safety-catch," the compact form described in an application filed by me December 27, 1881, being preferred for this purpose. It will be seen that the open joint permits the ready connection of the chandelier and ceiling-wires, and also allows the wires to be disconnected when the chandelier is in use for testing or other purposes. The open joint, the insulating separation, and the wire connections are all hidden from sight by means of an ornamental shell, J, which may be the "canopy" of the chandelier or a shell above the same. This ornamental shell may be fixed in position; or it can be made adjustable vertically to give more convenient access to the inclosed parts, and in the latter case will be held in position by one or more set-screws. If a closed ornamental shell is employed instead of the open shell, it will be necessary to use an insulating-ring either at its upper or lower end, to preserve the electrical separation of the chandelier and gas-pipe.

The connection of the wires at the open joint C may be made upon the inner face of a block, K, of wood or other insulating material, Fig. 6, standing between the nut *f* and ring *b* on one side of the arms *d d*. The wires 2 4 are secured to the same binding screw or plate, while the wires 1 3 are secured to separate binding screws or plates, which are connected by a safety-catch link, *l*. The block K is held in position by means of a screw, *m*, which connects it with a similar block, M, on the opposite side of the arms *d d*. Instead of resting against the arms *d d*, the blocks K M may be made smaller, so as to set in between such arms and clamp the connections tightly between them.

To the lower end of the stem A is secured the usual supporting and distributing body, N, from which project the arms O, carrying the electric lamps L. The stem, body, and arms are of metal and support the ornamentation, whether in the form of metal, glass, or other material.

In gas-chandeliers the ornamental parts below the body are sustained by a rod screwed centrally into the body, and having a finishing-knob or equivalent part screwed onto its lower end for furnishing the means for supporting the ornamental parts above it. Great difficulty has been experienced in wiring this class of chandeliers for electric light purposes and in making the proper connections between the arm-wires and the main or stem wires of the chandelier, it being essential to retain the central support for the lower ornamental parts. For this purpose I make a conveniently-large opening through the bottom of the body N and turn into it a pipe, through the sides of which the stem-wires 3 4 and arm-wires 5 6 can be passed, so as to enable the connections to be made outside of the same. This pipe receives a screw-plug in its lower end, which carries the rod for supporting the ornamentation. I prefer to use for this purpose a short section of pipe, P, provided with two slots, *n n*, extending from the lower end of the pipe-section, although a form of open section or joint similar to that used at the upper end of the chandelier-stem might be employed. The wires 3 4 and 5 6 are drawn through the opening in the body, and the slotted section P is then screwed into such opening. The wires are properly separated, one stem-wire and half of the arm-wires (one from each arm) being bent into each of the slots *n n*. The wires of each bunch are connected together electrically and the joint covered with insulating material. To make these connections I prefer to leave one arm-wire in cutting off the wires longer than the others. After the wires are scraped this arm-wire is twisted tightly around the other wires, and the joint is then soldered, after which the insulating-covering is put on. The open section P receives a screw plug or collar, Q, from which projects the rod R, having the finishing-knob *p*, which supports the ornamental shell *q*, inclosing and hiding from sight the slotted section and the connections. It will be seen that the slotted section allows the wires to be drawn out through the bottom of the body and permits the connections to be made readily, and also provides means for restoring the center for furnishing a support to the ornamental parts. This construction is adapted as well for crystal chandeliers and for any extent of elaboration in the ornamental parts.

Figure 7:
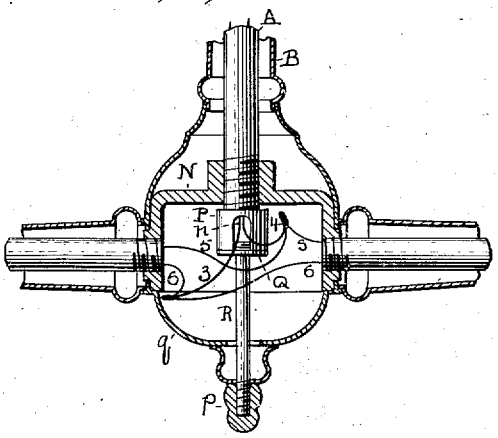

In Fig. 7 is shown the slotted section P, used in a form of chandelier of special construction for electric-light purposes. The body N is made larger than in the chandelier before described, and has an open bottom. The stem A is turned through the upper side of the body and receives the slotted section P, which in this case is provided with a female thread. The rod R, pendent from plug Q, has a screw-knob, *p*, which supports, among other ornamental parts, a shell, *q*, closing the lower side of the open body and hiding the connections.

The stem-wires are taken out through the slots *n n* and the connections made in the large body. Since only the stem-wires are passed through the slots *n n* in this case, one slot alone might be used; but I prefer to use the two slots.

The pendent rod R, connected with the slotted section P, in addition to supporting parts of the chandelier, may be employed to support any part that may be used as an electrical element of the chandelier.

The means described for getting the wires out of the body of a chandelier to make proper connections and for restoring the center are applicable to standards, brackets, and all classes of fixtures using a distributing and supporting body for two or more arms.

It is evident that many modifications in the details of construction of the several features before described could be made without departing from the spirit of my invention.

What I claim is—

1. A fixture for electric lights constructed wholly or largely of metal and provided with insulated conducting wires for conveying current to and from the lamps carried thereby, in combination with a joint or section having metallic coupling portions and an intermediate section of insulating material electrically insulating the metallic coupling portions from each other, such joint being located at the upper or inner end of the fixture and serving to electrically insulate the fixture from the grounded piping of a house by which it is supported, substantially as set forth.

2. In a fixture for electric lights adapted to be supported from the grounded piping of a house, the combination with the hollow metal stem, of insulated conducting wires passing therethrough for conveying current to and from the lamps carried by the fixture, a joint or section located at the upper or inner end of such hollow metal stem, comprising metallic coupling portions and an intermediate section of insulating material electrically insulating the metallic coupling portions from each other and provided with lateral openings for permitting the said conducting wires to pass out of the hollow stem for connection with the ceiling wires, substantially as set forth.

3. The combination, with a pipe support and an electric light fixture, of the open and insulating connecting joint or section C, composed of rings *b c* and connecting arms *d d*, block D and nut *f*, substantially as set forth.

4. In an electric light fixture, the combination with the hollow main stem, a distributing body and open section supported thereby, and two or more lamp-carrying arms supported by said distributing body, of insulated main conducting wires passing through such hollow main stem and through said open section, a pair of insulated arm wires passing through each of said lamp-carrying arms, said main and arm wires being directly connected together, and a central support from said open section for sustaining ornamental parts of the fixture, substantially as set forth.

5. In an electric light fixture adapted to be supported from the grounded piping of a house, the combination with the hollow main stem, a distributing body and open section and lamp-carrying arms, constructed of metal, of insulated main conducting wires passing through said main stem and through said open section, a pair of insulated arm wires passing through each of said lamp-carrying arms, said main and arm wires being directly connected together, an open and insulating joint or section at the upper or inner end of said main stem comprising metallic coupling portions and an intermediate section of insulating material, adapted to connect the fixture mechanically with, and to electrically insulate it from, the grounded piping of a house and permitting the said main conducting wires to pass out of said hollow main stem for connection with the ceiling wires, and a central support from said open section for sustaining ornamental parts of the fixtures, substantially as set forth.

6. In an electric light fixture, the combination, with the main stem or arm and distributing body, of the section P, having slots *n n*, the screw plug or collar Q, and rod R, substantially as set forth.

This specification signed and witnessed this 14th day of December, 1894.

LUTHER STIERINGER.

Witnesses:
EUGENE CONRAN,
W. PELZER.